3,850,914
NOVEL ALKYL-BENZOXAZOLYL-p-PHENYL
STILBENES
Christian Luthi, Basel, Switzerland, assignor to Ciba-
Geigy AG, Basel, Switzerland
No Drawing. Filed Sept. 28, 1972, Ser. No. 293,283
Claims priority, application Switzerland, Oct. 7, 1971,
14,584/71
Int. Cl. C09b 23/00
U.S. Cl. 260—240 CA        1 Claim

ABSTRACT OF THE DISCLOSURE

The invention concerns selected alkyl-benzoxazolyl-stilbene derivatives and their application as optical brighteners for synthetic organic polymerisation, polycondensation and polyaddition products, especially for polyester materials.

These new compounds correspond to the formula (1) 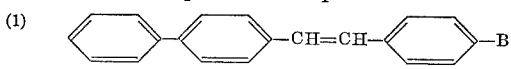

wherein B denotes a radical of the formula

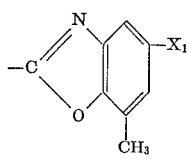

or

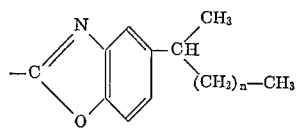

in which $X_1$ stands for hydrogen or an alkyl group containing 1 to 4 carbon atoms and $n=0$ or 1.

---

The invention concerns selected alkyl-benzoxazolyl-stilbene derivatives and their application as optical brighteners for synthetic organic polymerisation, polycondensation and polyaddition products, especially for polyester materials.

It is already known that compounds of the general formula

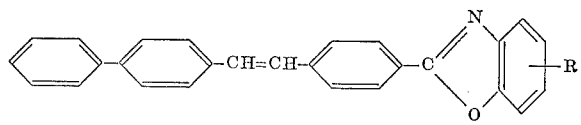

are suitable as optical brighteners for organic materials. Compounds of this type, that is to say also those in which the substituents R could stand not only for hydrogen but also for various non-chromophoric radicals in any position, gave quite satisfactory results at the time of their discovery.

Since then it has been found that a few selected compounds within this general framework have very specific advantages, as against most closely related compounds, which especially consist of significantly higher maximum effects and/or very considerably improved yield and partly in improved fastness to chlorine.

These new compounds correspond to the formula (1) 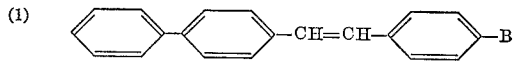

wherein B denotes a radical of the formula

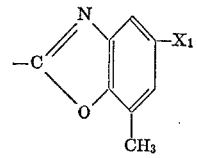

or

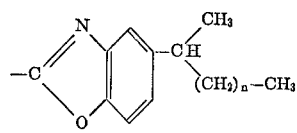

in which $X_1$ stands for hydrogen or an alkyl group containing 1 to 4 carbon atoms and $n=0$ or 1.

The chosen compounds correspond preferably to the formula (2) 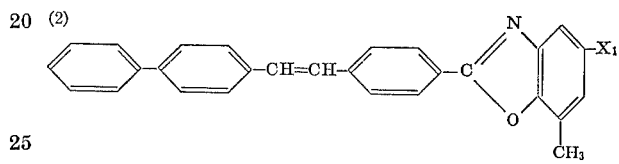

wherein $X_1$ stands for hydrogen or an alkyl group containing 1 to 4 carbon atoms.

These substances are particularly suitable for the optical brightening of polyester substrates, both by the high temperature exhaust process and by the pad thermofix process.

The compounds of the formula (3) 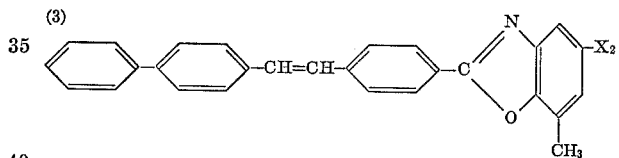

wherein $X_2$ stands for hydrogen or methyl, prove to be very specially valuable.

The compounds previously defined can be manufactured analogously to methods of manufacture which are in themselves known.

For example, manufacture can be carried out via the oxazole ring closure route in the final stage. As illustrated by the example of compounds of the formula (2), the manufacture of these compounds is carried out in such a manner, that carboxylic acids or carboxylic acid halides of the formula (4) 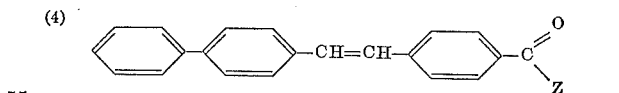

wherein Z stands for hydroxyl —or halogen, preferably chlorine, are reacted with aminophenols of the formula (5) 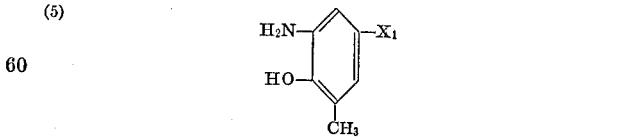

[In the case of the manufacture of compounds according to formula (1), the aminophenol of the formula (5a) 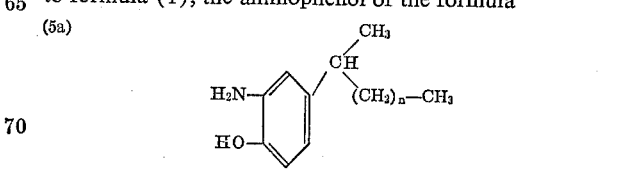

is, where appropriate, also used in an analogous manner.]

The reaction between the particular components of formulae (4) and (5) can be accomplished with or without intermediate separation of the acid amide-intermediate stage, which first occurs, by heating to elevated temperatures, for example to 120 to 350° C., advantageously in an inert gas, for example a stream of nitrogen, in which case the reaction is where appropriate carried out in the presence of a catalyst. Suitable catalysts are for example boric acid, boric acid anhydride, zinc chloride, p-toluenesulphonic acid, and also polyphosphoric acids including pyrophosphoric acid. If boric acid is used as catalyst, this is advantageously used in an amount of 0.5 to 5%, relative to the total weight of the reaction mass. High boiling organic solvents can also be used conjointly, such as for example dimethylformamide, dichlorobenzene, trichlorobenzene and aliphatic oxy compounds, optionally etherified, for example propylene glycol, ethylene glycol monoethyl ether or diethylene glycol diethyl ether and high boiling esters of phthalic acid, for example dibutyl phthalate.

If a two stage process is used, carboxylic acid halides of the formula (4) can first be condensed at temperatures between 100 and 200° C. with the o-amino compound of the formula (5) in the presence of an inert organic solvent, such as toluene, xylenes, chlorobenzene, dichlorobenzene, trichlorobenzene or nitrobenzene, and the resulting acyl compounds can be converted into the end product according to formula (2) or (1) at temperatures between 150 and 350° C., optionally in the presence of a catalyst. If carboxylic acid chlorides are used as starting substances, then these can be manufactured immediately before the condensation with the o-amino compound from the free carboxylic acid and thionyl chloride (optionally with the addition of a catalyst, such as pyridine), in the solvent wherein the condensation subsequently takes place.

Another important method of manufacture consists on the synthesis according to the principle of the "anil synthesis." In accordance with this, an anil of the formula (6)

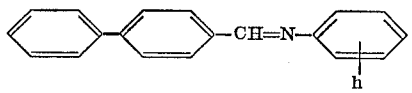

wherein $h$ appropriately stands for hydrogen or chlorine, is reacted with a methyl compound of the formula (7)

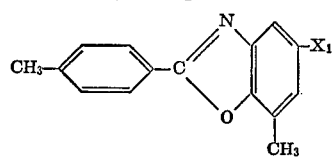

or (7a)

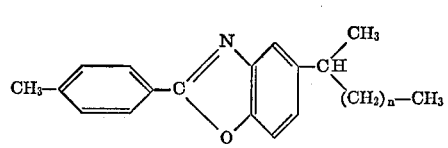

in dimethylformamide as reaction medium in the presence of a strongly basic alkali compound. By strongly basic alkali compounds should here be understood such compounds of the alkali metals including those of ammonia, which have a base strength of at least about that of lithium hydroxide. According to this, these can be compounds of lithium, sodium, potassium, rubidium, caesium or ammonium, for example of the type of the alcoholates, hydroxides, amides, hydrides or sulphides, or of the strongly basis ion exchanger type. Potassium compounds of the composition

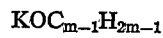

wherein $m$ represents an integer from 1 to 6, such as for example potassium hydroxide or potassium tertiary butylate, are used with advantage. In the case of alkali alcoholates, alkali amides (and hydrides) the reactions are to be carried out in a practically anhydrous medium, whereas in the case of alkali hydroxides water contents up to 25% (for example contents of water of crystallisation) are permitted. In the case of potassium hydroxide a water content of up to about 10% has proved to be appropriate. As examples of other usable alkali compounds there may be mentioned: sodium methylate, sodium hydroxide, sodium amide, lithium amide, lithium hydroxide, rubidium hydroxide, caesium hydroxide and the like. It is naturally also possible to work with mixtures of such bases.

The compounds of the formula (7) are appropriately reacted with equivalent amounts of the aldehyde anils, so that no significant excess of any component is present. At least the equivalent amount of the alkali compound is used advantageously, that is to say at least 1 mol of a compound with for example one KO group to one mol of aldehyde anil. If potassium hydroxide is used, the 4- to 8-fold amount is employed. The reaction can generally be carried out at temperatures in the region between about 10 and 150° C. If alcoholates are used as the potassium compound in the reaction, it is in general not necessary to apply heat. The procedure is for example to add the aldehyde anil to the mixture of the compound of the formula (7), the solvent and the potassium alcoholate, at a temperature between 15 and 30° C., appropriately whilst stirring and with the exclusion of air, whereupon the reaction takes place at once with a slight rise in temperature. If potassium hydroxide is used it is frequently necessary to work at an elevated temperature. For example, the reaction mixture is slowly heated to 30 to 100° C., and then kept for some time, for example ½ to 2 hours, at this temperature. The end products can be isolated from the reaction mixture by customary methods which are in themselves known.

The new compounds defined above possess a more or less pronounced fluorescence in the dissolved or finely divided state. Although they are preferably suitable for brightening polyamide fibres and, most especially, of polyester fibres, they can be used for the optical brightening of the most diverse synthetic or semi synthetic organic materials or substances which contain such organic materials.

The following groups of organic materials, where optical brightening thereof is relevant, may be mentioned by way of example:

I. Synthetic organic high molecular materials:

(a) Polymerisation products based on organic compounds containing at least one polymerisable carbon-carbon double bond, that is to say their homopolymers or copolymers as well as their after-treatment products such as, for example, crosslinking, grafting or degradation products, polymer blends, or products obtained by modification of reactive groups, for example polymers based on α,β-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as for example ethylene, propylene, styrenes or dienes, and also so called ABS-polymers) and polymers based on vinyl and vinylidene compounds (such as, for example, vinyl chloride, vinyl alcohol, vinylidene chloride), (b) Polymerisation products which are obtainable by ring opening, for example, polyamides of the polycaprolactam type, and also polymers which are obtainable both via polyaddition and via polycondensation, such as polyethers or polyacetals, (c) Polycondensation products or precondensates based on bifunctional or polyfunctional compounds possessing condensable groups, their homocondensation and co-condensation products, and after-treatment products, such as, for example, polyesters, especially saturated polyesters (for example ethylene glycol terephthalic acid polyesters)

or unsaturated polyesters (for example maleic acid dialcohol polycondensates and also their products of crosslinking with vinyl monomers which can be polymerised on to them), unbranched and also branched polyesters (including those based on polyhydric alcohols, such as for example alkyd resins), polyamides (for example hexamethylenediamine adipate), maleate resins, melamine resins, their precondensates and analogues, polycarbonates and silicones, (d) Polyaddition products such as polyurethanes (crosslinked and non-crosslinked) and epoxide resins.

II. Semi-synthetic organic materials, for example, cellulose esters of varying degrees of esterification (so-called 2½-acetate or triacetate) or cellulose ethers, regenerated cellulose (viscose or cuprammonium cellulose), or their after-treatment products, and casein plastics.

The organic materials to be optically brightened can be in the most diverse states of processing (raw materials, semi-finished goods or finished goods). On the other hand, they can be in the form of structures of the most diverse shapes, say for example predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics, textile laminates or knitted fabrics.

The special value of the compounds in accordance with the invention lies in their specific suitability as optical brighteners for saturated polyesters (for example of the type polyethylene terephthalate) and polyamides (for example hexamethylenediamine adipate).

The compounds according to the invention are of special importance for the treatment of organic textile materials, especially woven textile fabrics. Where fibres, which can be staple fibres or endless filaments in the form of hanks, woven fabrics, knitted fabrics, fleeces, flock substrates or laminates, are to be optically brightened according to the invention, this is advantageously effected in an aqueous medium, wherein the compounds in question are present in a finely divided form (suspensions or possibly solutions). If desired, dispersing agents, such as for example soaps, polyglycol ethers of fatty alcohols, fatty amines or alkylphenols, spent cellulose sulphite liquors or condensation products of optionally alkylated naphthalene sulphonic acids with formaldehyde, can be added during the treatment. It proves to be particularly useful to carry out the treatments in a neutral or weakly alkaline or acid bath. Likewise, it is advantageous if the treatment is carried out at elevated temperatures of about 70 to 150° C., for example near the boiling point of the bath. At temperatures over 100° C., for example 130° C., treatment is carried out in a closed system. Solutions in organic solvents can also be used for the finishing according to the invention, such as is practised in the dyeing trade, for example with polyamide and polyester substrates, in so-called solvent dyeing (pad-thermofix application, or exhaustion dyeing processes in drum dyeing machines).

The new optical brighteners to be used according to the invention can however also be added to, or incorporated in, the materials before or during their shaping. Thus they can for example be added to the compression moulding composition or injection moulding composition during the manufacture of films, foils, tapes or mouldings, or be dissolved or dispersed in the spinning solution before spinning, or a homogeneous fine dispersion can be provided in some other way. The optical brighteners can also be added to the starting substances, reaction mixtures or intermediate products for the manufacture of fully synthetic or semi-synthetic organic materials, that is either before or during the chemical reaction, for example in a polycondensation (including precondensation), in a polymerisation (including prepolymers), or in a polyaddition.

The new optical brighteners according to the present invention can, for example, also be employed in the following use forms:

(a) Mixed with dyestuffs (shading) or pigments (pigment dyes or especially, for example white pigments), or as an additive to dye baths, printing pastes, discharge pastes or reserve pastes. Also for the after-treatment of dyeings, prints or discharge prints.

(b) Mixed with so-called "carriers," wetting agents, plasticisers, swelling agents, anti-oxidants, light protection agents, heat stabilisers and chemical bleaching agents (chlorite bleaches and bleaching bath additives).

(c) Mixed with crosslinking agents or finishes (for example starch or synthetic finishes), and in combination with the most diverse textile finishing processes, such as, for example flameproof finishes, soft handle finishes, anti-soiling finishes or anti-static finishes or antimicrobial finishes.

(d) Incorporation of the optical brighteners into polymeric carriers (polymerisation, polycondensation or polyaddition products), in a dissolved or dispersed form, for use, for example, in coating compositions, impregnating compositions or binders (solutions, dispersions and emulsions) for textiles, fleeces, paper and leather.

(e) As additives to so-called "master batches."

(f) As additives to the most diverse industrial products in order to render these more marketable (for example improving the appearance of pigments).

(g) In combination with other optically brightening substances.

(h) In spinning bath preparations, that is to say as additives to spinning baths such as are used for improving the slip for the further processing of synthetic fibres, or from a special bath before the stretching of the fibre.

In the preferred application, namely for the brightening of polyester fibres, the brighteners are made fully effective by an after-treatment. This can, for example, represent a chemical treatment (for example chlorite treatment), a thermal treatment (for example heat) or a combined chemical/thermal treatment. Thus, the appropriate procedure to follow in optically brightening polyester fibres with the brighteners according to the invention is to impregnate these fibres with the aqueous dispersions (where appropriate, solutions) of the brighteners at temperatures below 75° C., for example at room temperature, and to subject them to a dry heat treatment at temperatures above 100° C., it being generally advisable additionally to dry the fibre material beforehand at a moderately elevated temperature, for example at not less than 60° C. and up to about 130° C. The heat treatment in the dry state is then advantageously carried out at temperatures between 120 and 225° C., for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and, where appropriate, up to about 2 percent by weight can also be employed. For most practical purposes, amounts between 0.0005 and 0.5 percent by weight are of preferred interest.

In the examples, the parts, unless otherwise stated, are always parts by weight and the percentages are always percentages by weight. Unless otherwise stated, melting points and boiling points are uncorrected.

Manufacturing Examples

Method A.—16 g. of 4'-phenyl-stilbene-4-carboxylic acid chloride are dissolved in 500 ml. of toluene under reflux. Subsequently a hot solution of 7.6 g. of 2-amino-4,6-dimethylphenol in 150 ml. of toluene is added dropwise within about 10 minutes under nitrogen. The suspension which is formed is subsequently kept under reflux for 6 hours, cooled to ice temperature and filtered. In this way 20.5 g. of the intermediate product of the formula (8)
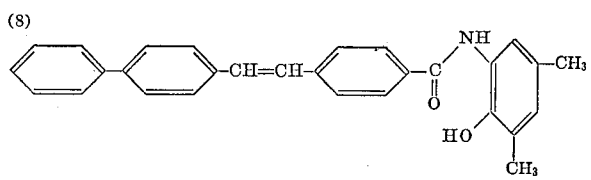

are obtained with a melting point of 258–260° C.

20.5 g. of the above compound in 200 ml. of trichlorobenzene in the presence of 0.6 g. of anhydrous boric acid are heated for 3 hours at reflux in an apparatus with a water separator, without intermediate purification. The mixture is filtered after cooling to 15° C. The residue is recrystallised from nonane and in this way 12.5 g. of the compound of the formula (9)
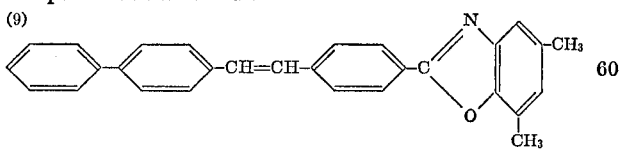

are obtained, which at 190–192° C. fuses to give a markedly turbid melt; at about 280° C., the melt becomes clear.

If preparation of the amide is carried out in trichlorobenzene at 170° C. instead of in toluene, the ring closure to give the end product can also be carried out without isolation of the amide.

Method B.—16.4 g. of p-toluic acid and 16.7 g. of 2-amino-4,6-dimethylphenol in 150 ml. of dichlorobenzene in the presence of 0.5 ml. of piperidine are heated to 150° C. under nitrogen in an apparatus with a water separator. In the course of 2 hours the temperature is raised to 180° C., 1 g. of anhydrous boric acid is added and the mixture is heated for 2 hours at reflux. After removing the solvent by steam distillation, 24.9 g. of the compound

(10)
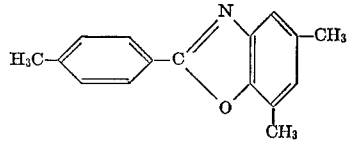

are obtained, which after a single recrystallisation from acetone-water melts at 84–87° C.

23.7 g. of the above compound are stirred together with 29.2 g. of 4-phenylbenzaldehyde-4'-chloranil in 400 ml. of anhydrous dimethylformamide at 20–25° C. under nitrogen, and 22.5 g. of potassium hydroxide are added. The mixture is heated for 2 hours at 40–45° C., poured out into 1000 g. of an ice-water mixture to which 200 ml. of concentrated hydrochloric acid had been added, the product is filtered off, washed with water until neutral and rinsed with 100 ml. of isopropanol. The crude product is subsequently dissolved in toluene, decolourised with fuller's earth and the solution is mixed with an equal volume of isopropanol. After cooling, filtration and rinsing with isopropanol 27.7 g. of the compound (9) are obtained, which has the same melting point as the compound obtained according to method A.

The above are obtained in an analogous manner:

| Compound | | Method | Melting point (° C.) |
|---|---|---|---|
| (11) | 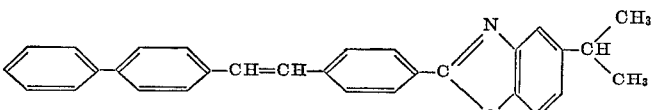 | A | 216–217° (very cloudy)-282° (clear). |
| (12) | 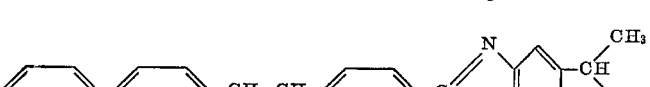 | A | 202–262°. |
| (13) | 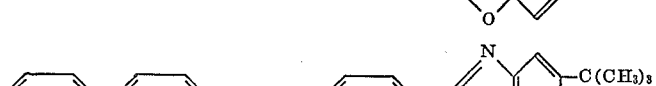 | A | 201–203°. |
| (14) |  | A, B | 192–193° (slightly cloudy) –215°. |

Use Examples

Example 1

A bath is prepared, using deionised water, which contains 0.16% per litre (relative to the fibre weight of the fabric to be brightened) of the compound of the formula (9) (predispersed with a little water and about 1 gram of a dispersing agent such as for example an ethoxylated stearyl alcohol) and about 2 grams of a carrier. A mixture of dodecylbenzenesulphonate (in the form of the triethanolamine salt), ethoxylated ricinoleic acid, n-hexanol and ethylene glycol in 1,2,4-trichlorobenzene can, for example, be used as a carrier.

The polyester fabric is introduced at 40° C. at a liquor ratio of 1:25; the temperature is raised to 97° C. in the course of 30 minutes and this temperature is maintained for a further 30 minutes. After rinsing and drying a very markedly brightened polyester fabric is thus obtained.

The compounds of the formulae (11), (12), (13) or (14) can also be used in a similar manner.

Results

| Compound No.: | Degree of whiteness [1] |
|---|---|
| Blank | 90 |
| (9) | 250 |
| (11) | 220 |
| (12) | 235 |
| (13) | 235 |
| (14) | 255 |

[1] Values in accordance with the CIBA scale of Whiteness (see for example Fette, Seifen und Anstrichmittel (Fats, Soaps and Paints), vol. 11, p. 881 ff [1968]).

Example 2

Polyester fabric is treated in an autoclave at a liquor ratio of 1:25 in a bath of the following compositon: 0.16% (relative to the fibre weight of the fabric to be brightened) of the compound of the formula (9) in a finely dispersed form, 1.0 g. of an ethoxylated stearyl alcohol, 1000 ml of deionised water.

The fabric is heated in the course of 30 minutes from 40° C. to 115° C., left for a further 30 minutes at 115° C., cooled, rinsed and dried. In this manner a brilliant white polyester fabric is obtained.

In a similar manner the compounds of the formulae (11), (12), (13) or (14) can also be used.

Results

| Compound No.: | Degree of whiteness [1] |
|---|---|
| Blank | 90 |
| (9) | 260 |
| (11) | 265 |
| (12) | 260 |
| (13) | 260 |
| (14) | 267.5 |

[1] See remark for Example 1.

Example 3

A polyester fabric (for example "Dacron") is padded at room temperature (about 20° C.) with an aqueous dispersion, which contains per litre 1.6 g. of the compounds of the formulae (9) or (14) and 1 g. of an addition product of about 35 mol of ethylene oxide with 1 mol of octadecyl alchol, and the fabric is dried at about 100° C. The dry material is subsequently subjected to a heat treatment for 30 seconds at about 160° C. The polyester fabric treated in this manner displays a marked optical brightening effect:

Results

| | Degree of whiteness [1] |
|---|---|
| Blank | 90 |
| (9) | 240 |
| (14) | 245 |

Degree of whiteness [1]

[1] See remark for Example 1.

NOTE.—If very similar compounds which are not covered by this patent are used, 2 g. and more per litre are required for the same effect.

Similar results are also obtained with the compounds of the formulae (10) to (13).

Example 4

The following amounts per litre are required for padding according to Example 3 in order to obtain a degree of whiteness of 240[1]) at a fixing temperature of 180° C.:

| Compound No.: | Amount (in grams) |
|---|---|
| (9) | 0.7 |
| (11) | 0.9 |
| (12) | 1.2 |
| (13) | 0.9 |
| (14) | 0.8 |

Amount (in grams)

[1] See remark for Example 1.

NOTE.—If very similar compounds which are not covered by this patent are used, 2 g. and more per litre are required for the same effect.

Example 5

An intimate mixture of 100 parts of polyvinyl chloride, 3 parts of stabiliser (Advastat BD 100; Ba/Cd complex), 2 parts of titanium dioxide, 59 parts of dioctyl phthalate and 0.01 to 0.2 part of one of the compounds of the formulae (9), (12) or (14) is calendered to a film on a calender at 150 to 155° C. The opaque polyvinyl chloride film which is obtained in this manner possesses a markedly higher whiteness than a film which does not contain the optical brightener.

Example 6

10 parts of polystyrene and 0.1 part of the compound of the formula (12) are fused for 20 minutes at 210° C. in a tube of 1 cm diameter while excluding air. After cooling, an optically brightened polystyrene composition of good light fastness is obtained. Similar effects are also obtained when using the compound No (14).

Example 7

1.5 g. of a delusterant, 1 g. of titanium dioxide (rutile type) and 0.05 g. of one of the compounds of the formulae (11) or (13) are stirred into a polyurethane coating composition consisting of 13.3 g. of an isocyanate modified polyester, 26.7 g. of ethyl acetate, 2 g. of a reaction accelerator and 2 g. of a polyfunctional isocyanate as a crosslinking agent. This mixture is allowed to stand for 2 hours and is then spread with a coating knife or a film drawing rod onto a cotton fabric (wet film thickness 1 mm.). The coating is then dried for 24 hours at room temperature. The fabric coated in this manner displays a marked optical brightening effect with good light fastness.

Example 8

10,000 g. of a polyamide in the form of chips, manufactured in a known manner from hexamethylenediamine adipate, are mixed with 30 g. of titanium dioxide (rutile modification) and 5 g. of one of the compounds of the formulae (9), (11), (12) or (13) for 12 hours in a rotaing drum. The chips treated in this manner are melted in a kettle, heated to 300 to 310° C. with oil or diphenyl vapour, after displacing atmospheric oxygen by steam, and stirred for half an hour. The melt is thereupon extruded through a spinneret at a nitrogen pressure of 5 atmospheres gauge, and the cooled filament, spun in this way, is wound onto a bobbin. The fibres which are formed display an excellent brightening effect of good fastness to light.

If a polyamide manufactured from ε-caprolactam is used instead of a polyamide manufactured from hexamethylenediamine adipate, analogously good results are obtained.

Example 9

100 g. of polyester granules consisting of a terephthalic acid-ethylene glycol polyester are intimately mixed with 0.05 g. of one of the compounds of the formulae (9), (11) or (14) and melted at 285° C. while stirring. After spinning through customary spinnerets, markedly brightened polyester fibres are obtained.

The compounds of the formulae (9), (11) or (14) can also be added to the starting substances before or during the polycondensation to form the polyester.

Example 10

Polypropylene fibres or polyethylene fibres are treated for 60 minutes at 60 to 100° C. in a bath, which contains 5 g. per litre of an addition product of about 35 mol of ethylene oxide with 1 mol of octadecyl alcohol and 0.5 g. of trisodium phosphate, with 0.02 to 0.4% of one of the compounds of the formulae (9), (11) or (12), at a liquor ratio of 1:40. The material is then rinsed and dried. The polyolefine fibres which are obtained in this manner display a significantly higher whiteness than the untreated fibres.

If 1 g. of 85% strength formic acid is used instead of 0.5 g. of trisodium phosphate, a similar effect is obtained.

The compounds of the formulae (9), (12), (13) or (14) are especially suitable for brightening polyolefine fibres by the padding process.

Example 11

A polyamide fibre fabric (Perlon) is introduced at a liquor ratio of 1:40 at 60° C. into a bath, which contains 0.1% of one of the brighteners of the formulae (9), (11), (13) or (14) and 1 g. per litre of 80% strength acetic acid and 0.25 g. per litre of an addition product of 30 to 35 mol of ethylene oxide with one mol of technical stearyl alcohol (relative to the weight of material). The bath is heated to boiling temperature within 30 minutes and maintained at boiling point for 30 minutes. After rinsing and drying a marked brightening effect of good light fastness is obtained.

If a fabric of polyamide 66 (Nylon) is used instead of the polyamide 6 fabric, similarly good brightening effects are achieved.

It is also possible to proceed under HT-conditions, that is to say for 30 minutes at 130° C. An addition of 3 g./l. of hydrosulphite to the liquor is recommended for this manner of application.

The compounds of the formulae (12) or (14) are particularly suitable for brightening polyamide fibres by the padding process.

What is claimed is:

1. An alkyl-benzoxazolylstilbene derivative of the formula

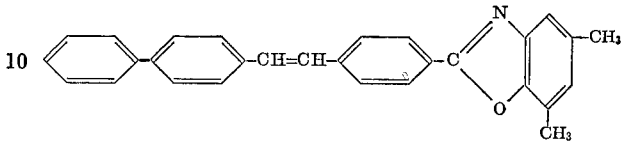

References Cited
UNITED STATES PATENTS
3,725,395    4/1973   Siegrist et al. _____ 260—240 CA JOHN D. RANDOLPH, Primary Examiner U.S. Cl. X.R.

8—64; 117—33.5 R, 33.5 T; 106—124, 148, 176; 252—152, 301.2 W, 543; 260—2 S, 46.5 R, 47 EP, 63 FP, 73 L, 75 N, 77.5 D, 78 R, 78.5 T, 79, 79.7, 80.3 R